US012651351B2

(12) United States Patent
Onuki

(10) Patent No.: US 12,651,351 B2
(45) Date of Patent: Jun. 9, 2026

(54) INFORMATION PROCESSING APPARATUS, INFORMATION PROCESSING METHOD, AND PROGRAM

(71) Applicant: Sony Interactive Entertainment Inc., Tokyo (JP)

(72) Inventor: Yoshikazu Onuki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 555 days.

(21) Appl. No.: 17/802,699

(22) PCT Filed: Mar. 19, 2020

(86) PCT No.: PCT/JP2020/012277
§ 371 (c)(1),
(2) Date: Aug. 26, 2022

(87) PCT Pub. No.: WO2021/186668
PCT Pub. Date: Sep. 23, 2021

(65) Prior Publication Data
US 2023/0095977 A1 Mar. 30, 2023

(51) Int. Cl.
*G06T 7/20* (2017.01)
*G06N 3/0475* (2023.01)
(Continued)

(52) U.S. Cl.
CPC ............ *G06T 7/20* (2013.01); *G06N 3/0475* (2023.01); *G06N 3/088* (2013.01); *G06N 3/094* (2023.01);
(Continued)

(58) Field of Classification Search
CPC .... G06V 10/774; G06V 10/82; G06V 10/776; G06V 40/18–197; G06V 40/16–171;
(Continued)

(56) References Cited

U.S. PATENT DOCUMENTS

2011/0170060 A1* 7/2011 Gordon .................. A61B 3/113
351/246
2020/0257358 A1* 8/2020 Rosell .................... G06V 10/44

FOREIGN PATENT DOCUMENTS

JP 2019168608 A 10/2019
JP 2019204392 A 11/2019

OTHER PUBLICATIONS

Fuhl, Wolfgang, et al. "The applicability of cycle gans for pupil and eyelid segmentation, data generation and image refinement." Proceedings of the IEEE/CVF International Conference on Computer Vision Workshops. 2019. (Year: 2019).*

(Continued)

*Primary Examiner* — Gregory A Morse
*Assistant Examiner* — Stefano Anthony Dardano
(74) *Attorney, Agent, or Firm* — Kilpatrick Townsend & Stockton LLP

(57) ABSTRACT

There is provided an information processing apparatus including a generator building section configured to build a generator for generating image data of a first domain from image data of a second domain and for generating the image data of the second domain from the image data of the first domain by use of cycle GAN (generative adversarial networks). The first domain is defined by image data of a plurality of channels including at least two time series images each including a first object and a second object, each of the objects having a tendency to move differently. The second domain is defined by the image data of a plurality of the channels including at least the two time series images each including the first object and excluding the second object.

8 Claims, 4 Drawing Sheets

(51) Int. Cl.
    *G06N 3/088*     (2023.01)
    *G06N 3/094*     (2023.01)

(52) U.S. Cl.
    CPC ............... *G06T 2207/20081* (2013.01); *G06T 2207/30201* (2013.01)

(58) Field of Classification Search
    CPC ........ G06V 10/764; G06T 2207/20081; G06T 2207/20084; G06T 2207/30201; G06T 7/20
    See application file for complete search history.

(56)              References Cited

OTHER PUBLICATIONS

Funke, Isabel, et al. "Generative adversarial networks for specular highlight removal in endoscopic images." Medical imaging 2018: Image-guided procedures, robotic interventions, and modeling. vol. 10576. SPIE, 2018. (Year: 2018).*

Zhu, Jun-Yan, et al. "Unpaired image-to-image translation using cycle-consistent adversarial networks." Proceedings of the IEEE international conference on computer vision. 2017. (Year: 2017).*

International Search Report for corresponding PCT Application No. PCT/JP2020/012277, 5 pages, dated May 26, 2020.

Megumi Nakao, et al., "Metal artifact reduction using CycleGAN for CT images", IEICE Technical Report, No. 119, No. 193, pp. 63-68, Sep. 1, 2019 (See Non-Pat. Lit. #1).

Yusuke Edamoto, et al., "Scene Identification from Corneal Surface Reflection Images Using Generative Adversarial Networks", IPSJ SIG Technical Report (CVIM) vol. 2019-CVIM-217, No. 12, pp. 1-8, May 30, 2019 (See Non-Pat. Lit. #1).

Yu Mitsuzumi, et al., "A Generative Self-Ensemble Approach to Simulated + Unsupervised Learning" IEICE Technical Report, vol. 118, No. 513, pp. 137-142, Mar. 1, 2019 (See Non-Pat. Lit. #1).

Jun-Yan Zhu, et al., "Unpaired Image to Image Translation using Cycle Consistent Adversarial Networks" ICCV, 18 pages, Mar. 30, 2017 (See instant Specification filed).

* cited by examiner

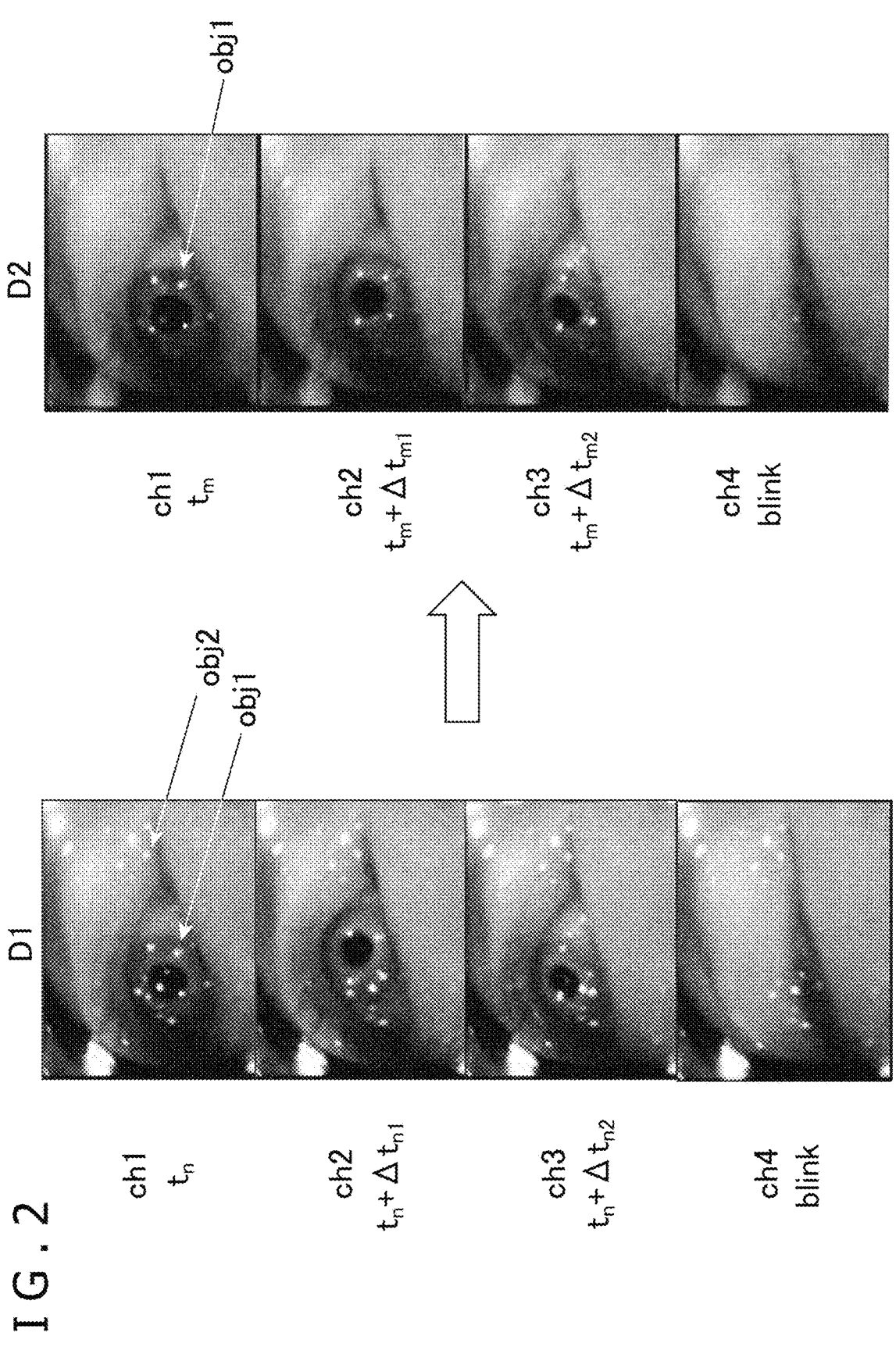
F I G . 2

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

GAN (generative adversarial networks) has been known as one method of unsupervised learning. Also, a method called cycle GAN described in NPL 1 has been proposed as an application of GAN. In cycle GAN, with a translation source of learning data not paired with a translation destination thereof, a generator and a discriminator are each allowed to learn groups of images having common characteristics (domains) so as to build a model that translates the characteristics between the domains.

CITATION LIST

Non Patent Literature

[NPL 1] Jun-Yan Thu, Taesung Park, Phillip Isola, Alexei A. Efros, "Unpaired Image-to-Image Translation using Cycle-Consistent Adversarial Networks," ICCV, pages 2223-2232, 2017

SUMMARY

Technical Problem

An object of the present invention is to provide an information processing apparatus, an information processing method, and a program for improving, by application of the above-described cycle GAN method, the accuracy of analyzing images including two different objects each having a tendency to move differently.

Solution to Problem

According to an aspect of the present invention, there is provided an information processing apparatus including a generator building section configured to build a generator for generating image data of a first domain from image data of a second domain and for generating the image data of the second domain from the image data of the first domain by use of cycle GAN. The first domain is defined by image data of a plurality of channels including at least two time series images each including a first object and a second object, each of the objects having a tendency to move differently. The second domain is defined by the image data of a plurality of the channels including at least the two time series images each including the first object and excluding the second object. According to another aspect of the present invention, there is provided an information processing apparatus including an image generation section configured to generate image data of a first domain from image data of a second domain as well as to generate the image data of the second domain from the image data of the first domain using a generator built by use of cycle GAN. The first domain is defined by image data of a plurality of channels including at least two time series images each including a first object and a second object, each of the objects having a tendency to move differently. The second domain is defined by the image data of a plurality of the channels including at least the two time series images each including the first object and excluding the second object.

According to a further aspect of the present invention, there is provided an information processing method including the steps of building a generator for generating image data of a first domain from image data of a second domain and for generating the image data of the second domain from the image data of the first domain by use of cycle GAN, and generating the image data of the first domain from the image data of the second domain as well as generating the image data of the second domain from the image data of the first domain by use of the generator. The first domain is defined by image data of a plurality of channels including at least two time series images each including a first object and a second object, each of the objects having a tendency to move differently. The second domain is defined by the image data of a plurality of the channels including at least the two time series images each including the first object and excluding the second object.

According to an even further aspect of the present invention, there is provided a program for causing a computer to function as an information processing apparatus including a generator building section configured to build a generator for generating image data of a first domain from image data of a second domain and for generating the image data of the second domain from the image data of the first domain by use of cycle GAN. The first domain is defined by image data of a plurality of channels including at least two time series images each including a first object and a second object, each of the objects having a tendency to move differently. The second domain is defined by the image data of a plurality of the channels including at least the two time series images each including the first object and excluding the second object.

According to a still further aspect of the present invention, there is provided a program for causing a computer to function as an information processing apparatus including an image generation section configured to generate image data of a first domain from image data of a second domain as well as to generate the image data of the second domain from the image data of the first domain using a generator built by use of cycle GAN. The first domain is defined by image data of a plurality of channels including at least two time series images each including a first object and a second object, each of the objects having a tendency to move differently. The second domain is defined by the image data of a plurality of the channels including at least the two time series images each including the first object and excluding the second object.

BRIEF DESCRIPTION OF DRAWINGS

FIG. 2 is a diagram depicting exemplary images of different domains in the example in FIG. 1.

DESCRIPTION OF EMBODIMENTS

Figure 1:
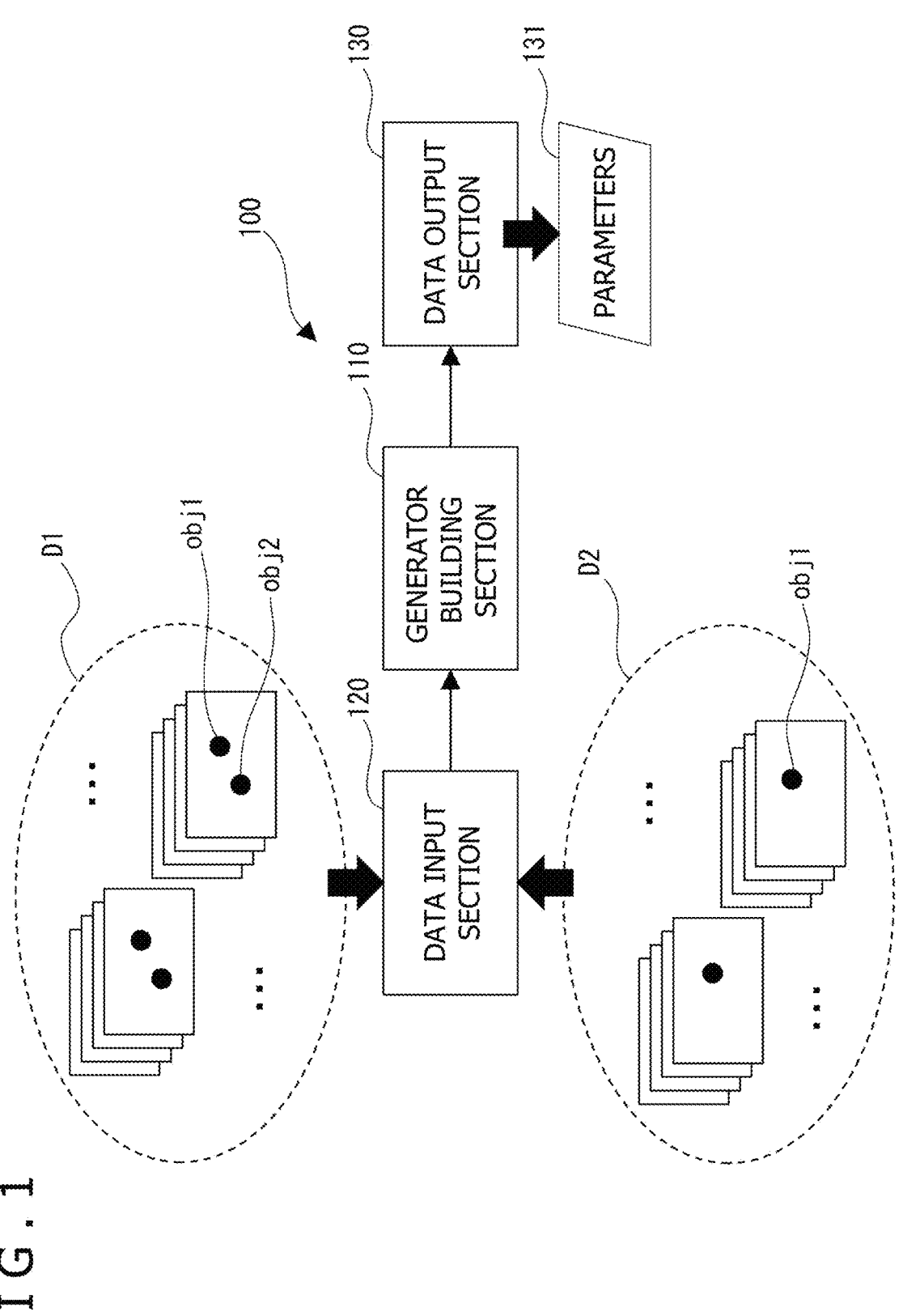
FIG. 1 is a diagram depicting a schematic configuration of a learning apparatus according to one embodiment of the present invention.

Some embodiments of the present invention are described below in detail with reference to the accompanying drawings. Throughout the ensuing description and the drawings, the constituent elements having substantially identical functions and configurations are represented by the same reference characters, and redundant explanations are omitted.

FIG. 1 is a diagram depicting a schematic configuration of a learning apparatus according to one embodiment of the present invention. In this illustrated example, a learning apparatus 100 may be implemented either as a single apparatus or as a plurality of distributed apparatuses cooperating on a network. The learning apparatus 100 is an information processing apparatus implemented either by a computer having a communication interface, a processor, and a memory, for example, or, by software, realizing diverse functions such as those to be explained below in accordance with programs received via the communication interface.

The learning apparatus 100 includes a generator building section 110 that builds a generator for generating image data of a second domain D2 from image data of a first domain D1 using cycle GAN (generative adversarial networks). The first domain D1 is defined by the image data of a plurality of channels each including at least two time series images including a first object obj1 and a second object obj2, the first object obj1 moving in a relatively large manner within the image, the second object obj2 moving in a relatively small manner in the image. The second domain D2 is defined by image data of a plurality of channels including at least two time series images each including the first object obj1 and excluding the second object obj2.

Specifically, with this embodiment, the time series images defining the first domain D1 and the second domain D2 are images that capture the reflection of the light emitted toward an eyeball as depicted in FIG. 2. The light source may be an infrared ray LED (light emitting diode), for example. The first object obj1 is a bright point of the reflected light from the cornea in the eyeball (this point may be referred to also as the cornea bright point hereunder). The second object obj2 is a bright point of the reflected light from the glasses positioned overlapping the eyeball (this point may be referred to also as the glass bright point hereunder). The images of the first domain D1 are each taken of a user wearing the glasses and each include both the first object obj1 and the second object obj2. On the other hand, the images of the second domain D2 are each taken of the user not wearing the glasses and each include the first object obj1 and exclude the second object obj2. Using cycle GAN, the generator building section 110 translates the images of the first domain D1 each including the objects obj1 and obj2 into the images of the second domain D2 each including the object obj1 only. That is, the generator building section 110 removes the object obj2 from the images of the first domain D1 to generate the images with only the object obj1 left therein.

FIG. 2 is a diagram that explains an input/output relationship of the generator, thus illustrating exemplary images of the first domain D1 and the second domain D2 as time series images paired with each other. However, the images of the first domain D1 and the second domain D2 for use as training data at the time of learning can be time series images that have been acquired at different times and taken of different objects. Time intervals between the time series images need not be the same as those between the domains or between the time series in the same domain. That is, whereas each of the images of the first domain D1 and the second domain D2 for use as the training data at the time of learning includes bright points of the eyeball and of the reflected light as the objects, the images are not those taken of the eyeball of the same user (or are those taken of the same user at different times, i.e., taken when the user wears the glasses and when the user does not wear the glasses). The first object obj1 included in the images of both domains is differently positioned from one image to another.

As described above, the cornea bright point as the first object obj1 has a relatively large movement in the image, while the glass bright point as the second object obj2 has a relatively small movement in the image. More specifically, in a case where images are acquired by a camera fixed to the user's head using a head-mounted device, for example, the cornea bright point (first object obj1) moves frequently in keeping with the eyeball movement, while the glass bright point (second object obj2) hardly moves because the positional relation between the glasses and the camera is fixed. Still, in a single image taken at a given time, there are few differences in characteristics between the cornea bright point (first object obj1) and the glass bright point (second object obj2), with the two bright points positioned close to each other. Thus, in traditional cycle GAN where the domains are defined by use of a single image, it is difficult to generate a model that would translate the image of the first domain D1 including both objects obj1 and obj2 as described above into the image of the second domain D2 including only the object obj1.

With this embodiment, the first domain D1 and the second domain D2 are defined by the image data of a plurality of channels each including at least two time series images. In this description, the time series images refer to a series of images taken of the same object at time intervals. Since the cornea bright point (first object obj1) moves frequently as discussed above, this bright point is highly likely to change its position between the time series images. On the other hand, since the glass bright point (second object obj2) moves very little, this bright point is highly likely to keep its position unchanged between the time series images. Thus, when the domains are each defined by the image data of a plurality of channels each including at least two time series images in cycle GAN, it is possible to generate a model capable of discrimination between the cornea bright point (first object obj1) and the glass bright point (second object obj2), which are difficult to discriminate using the characteristics in a single image.

Specifically, in the examples depicted in FIGS. 1 and 2, the first domain D1 and the second domain D2 are each defined by the image data of four channels input to a data input section 120. The image data of the first domain D1 is of the same object, i.e., of the user's eyeball, and includes an image (ch1) taken at time $t_n$, an image (ch2) taken at $t_n + \Delta t_{n1}$, an image (ch3) taken at time $t_n + \Delta T_{n2}$, and an image (ch4) of the most recent blink at time $t_n$. Likewise, the image data of the second domain D2 includes an image (ch1) taken at time $t_m$, an image (ch2) taken at $t_m + \Delta t_{m1}$, an image (ch3) taken at time $t_m + \Delta T_{m2}$, and an image (ch4) of the most recent blink at time $t_m$. As is well known with respect to cycle GAN, the image data of the second domain D2 for use in learning need not be the data paired with the image data of the first domain D1, i.e., the images in which the glass bright point (second object obj2) is deliberately removed from the same image.

In the above example, the image data defining the first domain D1 (including the cornea bright point and the glass bright point) and the image data defining the second domain D2 (including the cornea bright point and excluding the glass bright point) may be labeled beforehand and acquired separately, or may be sorted automatically depending on the number of bright points detected through image recognition. For example, in a case where images are acquired of the reflection of the light emitted from four light sources to the eyeball, the first domain D1 may be defined by the image data (4*ch*) in which the maximum number of bright points detected from the time series images does not exceed four, whereas the second domain D2 may be defined by the image data (4*ch*) in which the maximum number of the bright points exceeds four.

The data to be input to the data input section 120 may be the data already stored in a memory of the learning apparatus 100, or data offered from other apparatuses over networks or by means of recording media. Also, the data to be input to the data input section 120 may include image data acquired in real time by use of a camera. In the above examples, the domains are each defined by the image data of four channels including time series images. Alternatively, the domains may be defined by the image data of fewer or more channels. The "blink" image is added to the time series images defining the domains as an image indicative of a special state that excludes the first object (obj1). Getting the blink image included in the time series images improves the accuracy of translation when, for example, newly input image data of the first domain D1 includes a blink image.

Figure 3:
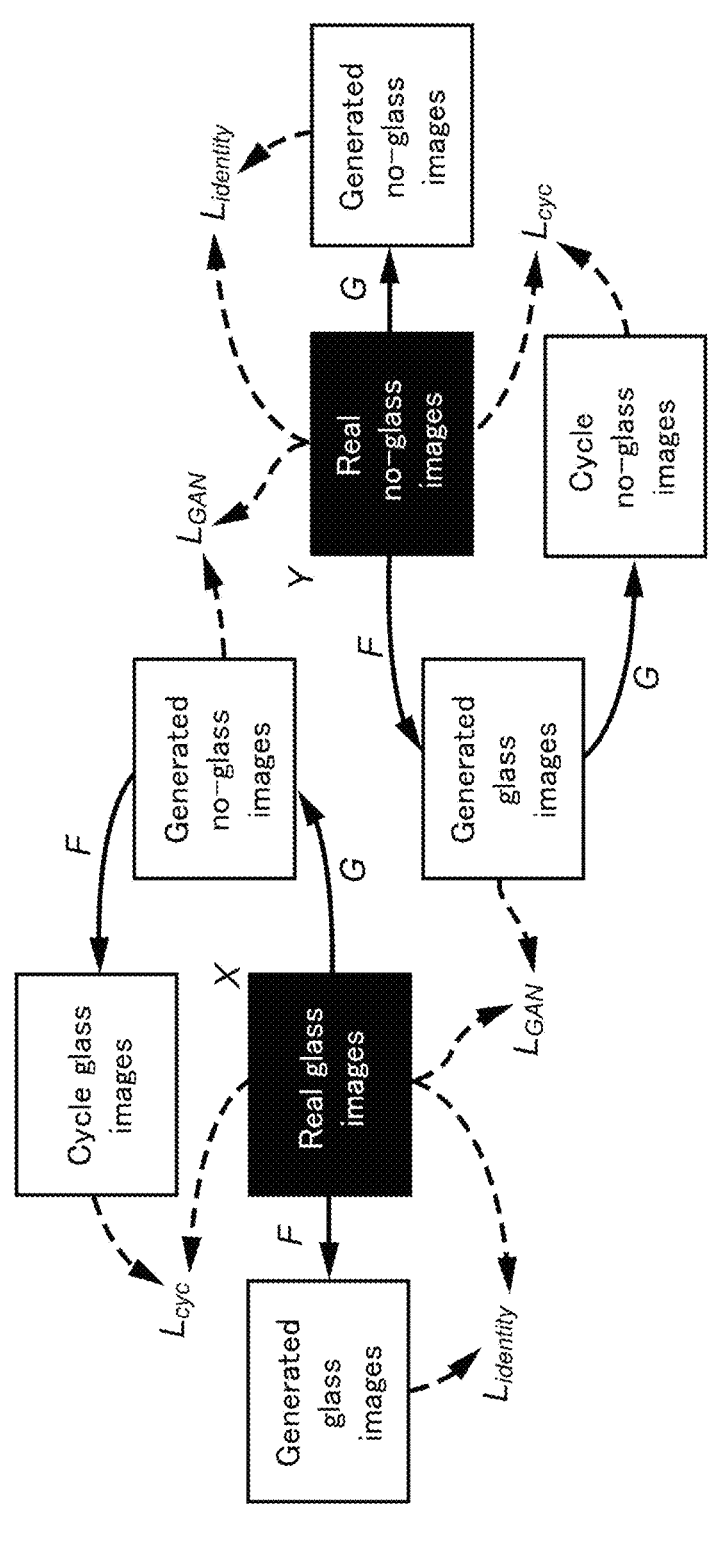
FIG. 3 is a diagram schematically depicting a model generated by one embodiment of the present invention using cycle GAN.

FIG. 3 is a diagram schematically depicting a model generated by one embodiment of the present invention using cycle GAN. This embodiment can use the method already known as cycle GAN except that the data defining the domains as discussed above are defined by the image data of a plurality of channels including at least two time series images. Specifically, cycle GAN involves learning the relationship in characteristics between real glass images (X; first domain D1) and real no-glass images (Y; second domain D2). Generated here are a generator (G) that generates the no-glass images from the glass images, a generator (F) that generates the glass images from the no-glass images (F), and discriminators $D_X$ and $D_Y$ that discriminate these images. A loss function is defined by the mathematical expression (1) given hereunder. In this expression, $L_{cyc}(G,F)$ denotes a cycle consistency loss, and $L_{identify}(G,F)$ represents an identity mapping consistency loss. Although it is not mandatory to introduce the identity mapping consistency loss, in a case where the data defining the domains as described in the present embodiment are defined by the image data of a plurality of channels, introducing this loss reduces the mixing action between the channels and thereby increases the effects of improving the accuracy of estimation models.

$$L(G,F,D_X,D_Y)=L_{GAN}(G,D_Y,X,Y)+L_{GAN}(F,D_X,Y,X)+L_{cyc}(G,F)+L_{identify}(G,F) \qquad \text{[Math. 1]}$$

The generators (G, F) and the discriminators ($D_X$, $D_Y$) generated in the above-described cycle GAN may be implemented using ResNet (residual network) and U-Net, respectively. The generator (G) built in such a manner as to minimize the loss function values can be used to generate the no-glass images (Y; second domain D2) from the newly input real glass images (X; first domain DO. The learning apparatus 100 causes a data output section 130 to output parameters 131 of the generators thus built.

Figure 4:
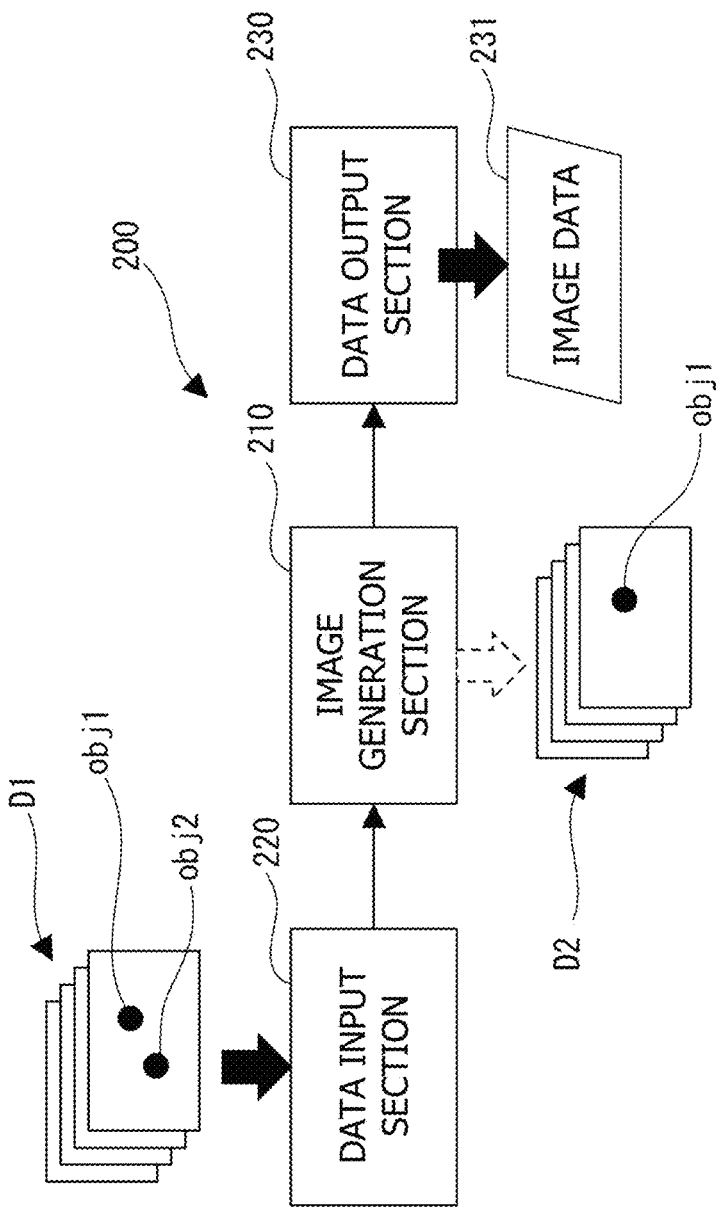
FIG. 4 is a diagram depicting a schematic configuration of an image generation apparatus according to one embodiment of the present invention.

FIG. 4 is a diagram depicting a schematic configuration of an image generation apparatus according to one embodiment of the present invention. In this illustrated example, an image generation apparatus 200 may be implemented either as a single apparatus or as a plurality of distributed apparatuses cooperating on a network. The image generation apparatus 200 is an information processing apparatus implemented either by a computer having a communication interface, a processor, and a memory, for example, or, by software, realizing diverse functions such as those to be explained below in accordance with programs received via the communication interface.

The image generation apparatus 200 includes an image generation section 210 that generates the image data of the second domain D2 from the image data of the first domain D1 using the generators built by use of cycle GEN. As explained above with respect to the learning apparatus, the first domain D1 is defined by the image data of a plurality of channels including at least two time series images each including the first object obj1 moving in a relatively large manner and the second object obj2 moving in a relatively small manner in the image. The second domain D2 is defined by the image data of a plurality of channels including at least two time series images each including the first object obj1 and excluding the second object obj2.

In this illustrated example, the image generation section 210 generates the image data of the second domain D2 from the image data of the first domain D1 (specifically, image data of four channels such as those depicted in FIG. 2) input to a data input section 220 using the generators built by use of the parameters 131 output from the above learning apparatus 100. This can provide the image data in which only the glass bright points (second objects obj2) are removed from the image data of the first domain D1 including the cornea bright points (first objects obj1) and the glass bright points (second objects obj2). The image generation apparatus 200 causes a data output section 230 to output the image data 231 thus generated. The image data to be output may be a portion of the image data of a plurality of channels generated by the image generation section 210, e.g., the most recent of the images except for the "blink" image from among the image data of four channels such as those depicted in FIG. 2.

The images output from the image generation apparatus 200 are used for line-of-sight estimation, for example. Specifically, the user's line of sight can be estimated from the relation between the center position of the pupil and the position of the cornea bright point in the image. As discussed above, this embodiment permits generation of the image data in which only the glass bright points are removed from the image data including the cornea bright points and the glass bright points. It is thus possible to prevent a decrease in the accuracy of line-of-sight estimation due to the glass bright points being mixed with the cornea bright points, thereby enabling highly accurate estimation of the line of sight even when the user wears the glasses.

Explained above is the example of building the generators for generating the image data in which only the glass bright points are removed from the image data including the cornea bright points and glass bright points, as well as the example of generating the image data using the generators. The invention, when embodied otherwise, can also be applied to diverse examples in which one type of object is removed from the images including two types of objects each presenting a different movement. Generated in the above examples are the images in which one of the two objects having the relatively smaller movement is removed. Conversely, images may be generated in which one of the two objects having the relatively smaller movement is added (by use of the generator (F) in the example depicted in FIG. 3).

Specifically, in images taken of the surrounding environment, the embodiment of the present invention may be used to isolate a foreground object (first object, such as people or cars) from a background object (second object). In this case, the embodiment can be used to acquire information regarding the surrounding environment using, for example, game controllers, smartphones, or various mobile objects (including automobiles, electric vehicles, hybrid electric vehicles, motorcycles, bicycles, personal mobility devices, aircrafts, drones, ships, and robots), to estimate the self-position from the positions of nearby objects, or to take evasive action by detecting an incoming flying object. The embodiment of the invention can also be used to identify the movement of the object such as people. Specifically, the embodiment is used by a robot to identify the movement of a communication partner or by a vehicle-mounted apparatus in order to detect specific movements of the driver and to output a warning accordingly.

In the examples explained above, the first object has the relatively large movement, and the second object has the relatively small movement in the image. However, these examples are not limitative as long as two objects are each recognized to present a tendency of moving differently in at least two time series images. For example, the embodiment of this invention can also be applied to a case in which the first object moves irregularly near a predetermined position while the second object moves regularly in one direction throughout the images.

The above examples explained that the learning apparatus 100 and the image generation apparatus 200 are independent apparatuses. Alternatively, these apparatuses may be implemented as one apparatus. For example, the parameters of generators built in advance may be used to generate the image data of the second domain D2 from the image data of the first domain D1, with the parameters updated by use of additionally acquired image data of the first domain D1 and the second domain D2.

Whereas some preferred embodiments of the present invention have been described above in detail with reference to the accompanying drawings, these embodiments are not limitative of this invention. It is obvious that those skilled in the art will easily conceive variations or alternatives of the invention within the scope of the technical idea stated in the appended claims. It is to be understood that such variations, alternatives, and other ramifications also fall within the technical scope of the present invention.

REFERENCE SIGNS LIST

100 Learning apparatus
110: Generator building section
120: Data input section
130: Data output section
131: Parameter
200: Image generation apparatus
210: Image generation section
220: Data input section
230: Data output section
231: Image data
D1: First domain
D2: Second domain
obj1: First object
obj2: Second object

The invention claimed is:
1. An information processing apparatus comprising:
a processor;
a memory storing computer readable instructions that, upon execution by the processor, configure the information processing apparatus to:

build a first generator for producing no-glass images by use of cycle generative adversarial networks (Cycle-GAN), build a second generator for producing glass images by use of CycleGAN, use the first generator to receive real glass images and produce therefrom first generated no-glass images, use the first generator to receive real no-glass image and produce therefrom second generated no-glass images, use the second generator to receive real no-glass images and produce therefrom first generated glass images, use the second generator to receive real glass images and produce therefrom second generated glass images, use the first generator to receive first generated glass image and produce therefrom cycle no-glass images, use the second generator to receive first generated no-glass images and produce therefrom cycle glass images, build a first discriminator for distinguishing between the real glass images, first generated glass images, second generated glass images, and cycle glass images, build a second discriminator for distinguishing between the real no-glass images, first generated no-glass images, second generated no-glass images, and cycle no-glass images, and minimize a loss function comprising a sum of Cycle-GAN loss (LGAN), cycle consistency loss (LcYC), and identity loss (Lidentity) while taking into consideration losses introduced by the first discriminator in distinguishing between the, real glass image data, first generated glass image data, second generated glass image data, and cycle glass image data and by the second discriminator in distinguishing between the real no-glass image data, first generated no-glass image data, second generated no-glass image data, and cycle no-glass image data, wherein the first domain is defined by glass image data corresponding to a plurality of first channels, each first channel of the plurality of first channels including at least two time series images, each time series image of the at least two time series images including a first object and a second object, wherein the first object exhibits a relatively large movement within the at least two time series images, and the second object exhibits relatively small movement or remains stationary within the at least two time series images; and the second domain is defined by no-glass image data corresponding to a plurality of second channels, the plurality of first channels and the plurality of second channels belonging to a set of channels, each second channel including at least the two time series images, the time series images each including the first object and excluding the second object, wherein the second object is removed based on relative motion characteristics of the second object within the time series images.

2. The information processing apparatus according to claim 1, wherein:

the first object is temporarily absent or occluded, and the second object has a relatively small movement in the time series images.

3. The information processing apparatus according to claim 2, wherein the time series images are each an image taken of reflection of light emitted to an eyeball, the first object is a bright point of reflected light from a cornea in the eyeball, the second object is a bright point of reflected light from glasses positioned overlapping the eyeball, and the generator generates the image data of the second domain from the image data of the first domain.

4. The information processing apparatus according to claim 1, wherein the time series images include at least one image that excludes the first object due to blinking.

5. An information processing apparatus comprising:

a processor;

a memory storing computer readable instructions that, upon execution by the processor, configure the information processing apparatus to:

provide a first generator for producing no-glass images by use of cycle generative adversarial networks (CycleGAN), provide a second generator for producing glass images by use of CycleGAN, use the first generator to receive real glass images and produce therefrom first generated no-glass images, use the first generator to receive real no-glass image and produce therefrom second generated no-glass images, use the second generator to receive real no-glass images and produce therefrom first generated glass images, use the second generator to receive real glass images and produce therefrom second generated glass images, use the first generator to receive first generated glass image and produce therefrom cycle no-glass images, use the second generator to receive first generated no-glass images and produce therefrom cycle glass images, provide a first discriminator for distinguishing between the real glass images, first generated glass images, second generated glass images, and cycle glass images, provide a second discriminator for distinguishing between the real no-glass images, first generated no-glass images, second generated no-glass images, and cycle no-glass images, and minimize a loss function comprising a sum of Cycle-GAN loss (LGAN), cycle consistency loss (LcYC), and identity loss (Lidentity) while taking into consideration losses introduced by the first discriminator in distinguishing between the, real glass image data, first generated glass image data, second generated glass image data, and cycle glass image data and by the second discriminator in distinguishing between the real no-glass image data, first generated no-glass image data, second generated no-glass image data, and cycle no-glass image data, wherein the first domain is defined by glass image data corresponding to a plurality of first channels, each first channel of the plurality of first channels including at least two time series images, each time series image of the at least two time series images including a first object and a second object, wherein the first object exhibits a relatively large movement within the at least two time series images, and the second object exhibits relatively small movement or remains stationary within the at least two time series images; and the second domain is defined by no-glass image data corresponding to a plurality of second channels, the plurality of first channels and the plurality of second channels belonging to a set of channels, each second channel including at least the two time series images, the time series images each including the first object and excluding the second object, wherein the second object is removed based on relative motion characteristics of the second object within the time series images.

6. An information processing method comprising:

building a first generator for producing no-glass images by use of cycle generative adversarial networks (Cycle-GAN);

building a second generator for producing glass image data by use of CycleGAN;

using the first generator to receive real glass image data and produce therefrom first generated no-glass images, using the first generator to receive real no-glass image data and produce therefrom second generated no-glass images, using the second generator to receive real no-glass images and produce therefrom first generated glass images, using the second generator to receive real glass images and produce therefrom second generated glass images, using the first generator to receive first generated glass images and produce therefrom cycle no-glass images, using the second generator to receive first generated no-glass images and produce therefrom cycle glass images, providing a first discriminator for distinguishing between the real glass images, first generated glass images, second generated glass images, and cycle glass images, providing a second discriminator for distinguishing between the real no-glass images, first generated no-glass images, second generated no-glass images, and cycle no-glass images, and minimizing a loss function comprising a sum of Cycle-GAN loss (LGAN), cycle consistency loss (LcYC), and identity loss (Lidentity) while taking into consideration losses introduced by the first discriminator in distinguishing between the primary, secondary, and tertiary first domain image data and by the second discriminator in distinguishing between the primary, secondary, and tertiary second domain image data, wherein the first domain is defined by glass image data corresponding to a plurality of first channels, each first channel of the plurality of first channels including at least two time series images, each time series image of the at least two time series images including a first object and a second object, wherein the first object exhibits a relatively large movement within the at least two time series images, and the second object exhibits relatively small movement or remains stationary within the at least two time series images; and \ the second domain is defined by no-glass image data corresponding to a plurality of second channels, the plurality of first channels and the plurality of second channels belonging to a set of channels, each second channel including at least the two time series images, the time series images each including the first object and excluding the second object, wherein the second object is removed based on relative motion characteristics of the second object within the time series images.

7. A non-transitory, computer readable storage medium containing a computer program, which when executed by a computer, causes the computer to function as an information processing apparatus, by carrying out actions, comprising:

building a first generator for producing glass images by use of cycle generative adversarial networks (CycleGAN);

building a second generator for producing glass image data by use of CycleGAN;

using the first generator to receive real glass image data and produce therefrom first generated no-glass images, using the first generator to receive real no-glass image data and produce therefrom second generated no-glass images, using the second generator to receive real no-glass images and produce therefrom first generated glass images, using the second generator to receive real glass images and produce therefrom second generated glass images, using the first generator to receive first generated glass images and produce therefrom cycle no-glass images, using the second generator to receive first generated no-glass images and produce therefrom cycle glass images, providing a first discriminator for distinguishing between the real glass images, first generated glass images, second generated glass images, and cycle glass images, providing a second discriminator for distinguishing between the real no-glass images, first generated no-glass images, second generated no-glass images, and cycle no-glass images, and minimizing a loss function comprising a sum of Cycle-GAN loss (LGAN), cycle consistency loss (LcYC), and identity loss (Lidentity) while taking into consideration losses introduced by the first discriminator in distinguishing between the primary, secondary, and tertiary first domain image data and by the second discriminator in distinguishing between the primary, secondary, and tertiary second domain image data, wherein the first domain is defined by glass image data corresponding to a plurality of first channels, each first channel of the plurality of first channels including at least two time series images, each time series image of the at least two time series images including a first object and a second object t, wherein the first object exhibits a relatively large movement within the at least two time series images, and the second object exhibits relatively small movement or remains stationary within the at least two time series images; and the second domain is defined by no-glass image data corresponding to a plurality of second channels, the plurality of first channels and the plurality of second channels belonging to a set of channels, each second channel including at least the two time series images, the time series images each including the first object and excluding the second object, wherein the second object is removed based on relative motion characteristics of the second object within the time series images.

8. A non-transitory, computer readable storage medium containing a computer program, which when executed by a computer, causes the computer to function as an information processing apparatus, by carrying out actions, comprising:

providing a first generator for producing glass images by use of cycle generative adversarial networks (CycleGAN);

providing a second generator for producing glass image data by use of CycleGAN;

using the first generator to receive real glass image data and produce therefrom first generated no-glass images, using the first generator to receive real no-glass image data and produce therefrom second generated no-glass images, using the second generator to receive real no-glass images and produce therefrom first generated glass images, using the second generator to receive real glass images and produce therefrom second generated glass images, using the first generator to receive first generated glass images and produce therefrom cycle no-glass images, using the second generator to receive first generated no-glass images and produce therefrom cycle glass images, providing a first discriminator for distinguishing between the real glass images, first generated glass images, second generated glass images, and cycle glass images, providing a second discriminator for distinguishing between the real no-glass images, first generated no-glass images, second generated no-glass images, and cycle no-glass images, and minimizing a loss function comprising a sum of Cycle-GAN loss (LGAN), cycle consistency loss (LcYC), and identity loss (Lidentity) while taking into consideration losses introduced by the first discriminator in distinguishing between the primary, secondary, and tertiary first domain image data and by the second discriminator in distinguishing between the primary, secondary, and tertiary second domain image data, wherein the first domain is defined by glass image data corresponding to a plurality of first channels, each first channel of the plurality of first channels including at least two time series images, each time series image of the at least two time series images including a first object and a second object t, wherein the first object exhibits a relatively large movement within the at least two time series images, and the second object exhibits relatively small movement or remains stationary within the at least two time series images; and the second domain is defined by no-glass image data corresponding to a plurality of second channels, the plurality of first channels and the plurality of second channels belonging to a set of channels, each second channel including at least the two time series images, the time series images each including the first object and excluding the second object, wherein the second object is removed based on relative motion characteristics of the second object within the time series images.

* * * * *